(12) United States Patent
Wenren et al.

(10) Patent No.: US 12,181,636 B2
(45) Date of Patent: Dec. 31, 2024

(54) OPTICAL IMAGING SYSTEM

(71) Applicant: ZHEJIANG SUNNY OPTICS CO., LTD., Zhejiang (CN)

(72) Inventors: Jianke Wenren, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 667 days.

(21) Appl. No.: 17/226,111

(22) Filed: Apr. 9, 2021

(65) Prior Publication Data
US 2021/0325641 A1    Oct. 21, 2021

(30) Foreign Application Priority Data

Apr. 10, 2020   (CN) .......................... 202010281535.6

(51) Int. Cl.
| | |
|---|---|
| *G02B 13/18* | (2006.01) |
| *G02B 5/04* | (2006.01) |
| *G02B 9/60* | (2006.01) |
| *G02B 13/00* | (2006.01) |
| *G02B 13/02* | (2006.01) |

(52) U.S. Cl.
CPC .......... *G02B 13/0045* (2013.01); *G02B 5/04* (2013.01); *G02B 9/60* (2013.01); *G02B 13/0065* (2013.01); *G02B 13/02* (2013.01)

(58) Field of Classification Search
CPC . G02B 9/00; G02B 9/60; G02B 13/00; G02B 13/001; G02B 13/0015; G02B 13/002; G02B 13/0045; G02B 13/0065; G02B 13/007; G02B 13/008; G02B 13/14; G02B 13/143; G02B 13/146; G02B 13/18

USPC ............... 359/713–714, 745–746, 749–754, 359/763–769

See application file for complete search history.

(56) References Cited

U.S. PATENT DOCUMENTS

| 10,775,595 | B2* | 9/2020 | Teraoka | G02B 13/0045 |
|---|---|---|---|---|
| 10,802,251 | B2* | 10/2020 | Lin | G02B 13/0065 |
| 2007/0126911 | A1* | 6/2007 | Nanjo | G02B 15/145115 |
| | | | | 348/335 |
| 2019/0243112 | A1* | 8/2019 | Yao | H04N 23/687 |
| 2020/0096745 | A1* | 3/2020 | Chang | G03B 5/04 |

FOREIGN PATENT DOCUMENTS

| CN | 107621687 A | 1/2018 |
|---|---|---|
| CN | 209486380 U | 10/2019 |

* cited by examiner

*Primary Examiner* — Thong Q Nguyen
(74) *Attorney, Agent, or Firm* — Samson G. Yu

(57) ABSTRACT

The disclosure discloses an optical imaging system, which includes: a lens group, sequentially including, from an object side to an image side along a first direction, a first lens, a second lens, a third lens, a fourth lens and a fifth lens with refractive power; a first prism, arranged on the object side of the lens group and configured to reflect light incident into the first prim along a second direction to be emergent from the first prism along the first direction; and a second prism, arranged on the image side of the lens group and configured to reflect light incident into the second prism along the first direction to be emergent from the second prism along a third direction, wherein the first direction, the second direction and the third direction are perpendicular to one another; at least one lens in the lens group is a plastic lens.

12 Claims, 3 Drawing Sheets

OPTICAL IMAGING SYSTEM

CROSS-REFERENCE TO RELATED DISCLOSURE(S)

The disclosure claims priority to and the benefit of Chinese Patent Disclosure No. 202010281535.6, filed in the China National Intellectual Property Administration (CNIPA) on 10 Apr. 2020, which is incorporated herein by reference in its entirety.

TECHNICAL FIELD

The disclosure relates to the field of optical elements, and more particularly to an optical imaging system.

BACKGROUND

Camera modules are usually arranged in portable devices such as mobile phones to endow the mobile phones with camera functions. In recent years, with the upgrading and updating of consumer electronic devices and the development of image software functions and video software functions in consumer electronic products, market demands in camera modules applied to portable electronic products have gradually increased. In a camera module, a Charge-Coupled Device (CCD) type image sensor or a Complementary Metal Oxide Semiconductor (CMOS) type image sensor is usually arranged, and an optical imaging system is also arranged. The optical imaging system may converge beams of an object side, imaged light follows a light path of the optical imaging system and irradiates the image sensor, and furthermore, the image sensor converts an optical signal into an electric signal to form image data.

With the increase of requirements of miniature electronic products such as smart phones on imaging functions, higher requirements have also been made to the optical performance of optical imaging systems. At present, mobile terminals pursue optical zoom ratios, and after values thereof increase, magnification factors for imaging of optical imaging systems increase and distant photographic fields may be shot more clearly. However, when a focal length of an optical imaging system increases, a total optical length thereof may also increase, and an optical imaging system in a relatively large size adversely affects miniaturization of an electronic product such as a mobile phone.

For meeting a miniaturization requirement and an imaging requirement, an optical imaging system capable of considering miniaturization, a great focal length and high imaging quality is required.

SUMMARY

Some embodiments of the disclosure provide an optical imaging system applicable to a portable electronic product and capable of at least overcoming or partially overcoming at least one shortcoming in a related art.

One embodiment of the disclosure provides an optical imaging system, which includes: a lens group, sequentially including, from an object side to an image side along a first direction, a first lens, a second lens, a third lens, a fourth lens and a fifth lens with refractive power; a first prism, arranged on the object side of the lens group and configured to reflect light incident into the first prism along a second direction to be emergent from the first prism along the first direction; and a second prism, arranged on the image side of the lens group and configured to reflect light incident into the second prism along the first direction to be emergent from the second prism along a third direction, wherein the first direction, the second direction and the third direction are perpendicular to one another; at least one lens in the lens group is a plastic lens, and at least one surface of the plastic lens is an aspherical surface; and a total effective focal length f of the optical imaging system meets f>20 mm.

In an implementation mode, the total effective focal length f of the optical imaging system and a length Ty of the optical imaging system in the third direction may meet $1.0 < f/Ty < 3.0$.

In an implementation mode, the total effective focal length f of the optical imaging system and a length Tz of the optical imaging system in the second direction may meet $2.0 < f/Tz < 4.0$.

In an implementation mode, ImgH is a half of a diagonal length of an effective pixel region on an imaging surface of the optical imaging system, the total effective focal length f of the optical imaging system and ImgH may meet $f/ImgH > 8$.

In an implementation mode, the total effective focal length f of the optical imaging system and an Entrance Pupil Diameter (EPD) of the optical imaging system may meet $f/EPD \leq 4.0$.

In an implementation mode, a refractive index N1 of the first lens and a refractive index N2 of the second lens may meet $0 < N2 - N1 < 0.2$; and an Abbe number V1 of the first lens and an Abbe number V2 of the second lens may meet $0 < V1 - V2 < 10$.

In an implementation mode, an Abbe number V4 of the fourth lens and an Abbe number V5 of the fifth lens may meet $50 < (V4 + V5)/2 < 60$.

In an implementation mode, the first lens has positive refractive power, the second lens has positive refractive power, the third lens has negative refractive power, the fourth lens has positive refractive power, and the fifth lens has negative refractive power.

In an implementation mode, an effective focal length f1 of the first lens and an effective focal length f2 of the second lens may meet $0.1 < f1/f2 < 0.3$.

In an implementation mode, the total effective focal length f of the optical imaging system and an effective focal length f4 of the fourth lens may meet $1.0 < f/f4 < 3.0$.

In an implementation mode, an effective focal length f3 of the third lens and an effective focal length f5 of the fifth lens may meet $2.0 < f3/f5 < 3.0$.

In an implementation mode, a sum $\Sigma CT$ of center thicknesses of each lens in the first lens to the fifth lens may meet $1.0 \text{ mm} < \Sigma CT/5 < 1.5 \text{ mm}$.

Another embodiment of the disclosure provides an optical imaging system, which includes a lens group, sequentially including, from an object side to an image side along a first direction, a first lens, a second lens, a third lens, a fourth lens and a fifth lens with refractive power; a first prism, arranged on the object side of the lens group and configured to reflect light incident into the first prism along a second direction to be emergent from the first prism along the first direction; and a second prism, arranged on the image side of the lens group and configured to reflect light incident into the second prism along the first direction to be emergent from the second prism along a third direction, wherein the first direction, the second direction and the third direction are perpendicular to one another; at least one lens in the lens group is a plastic lens, and at least one surface of the plastic lens is an aspherical surface; and ImgH is a half of a diagonal length of an effective pixel region on an imaging system of the optical imaging system, a total effective focal length f of the optical imaging system and ImgH meet f/ImgH>8.

In an implementation mode, the total effective focal length f of the optical imaging system and a length Ty of the optical imaging system in the third direction meet 1.0<f/Ty<3.0.

In an implementation mode, the total effective focal length f of the optical imaging system and a length Tz of the optical imaging system in the second direction meet 2.0<f/Tz<4.0.

In an implementation mode, the total effective focal length f of the optical imaging system meets f>20 mm.

In an implementation mode, the total effective focal length f of the optical imaging system and an EPD of the optical imaging system meet f/EPD≤4.0.

In an implementation mode, a refractive index N1 of the first lens and a refractive index N2 of the second lens meet 0<N2−N1<0.2; and an Abbe number V1 of the first lens and an Abbe number V2 of the second lens meet 0<V1−V2<10.

In an implementation mode, an Abbe number V4 of the fourth lens and an Abbe number V5 of the fifth lens meet 50<(V4+V5)/2<60.

In an implementation mode, the first lens has positive refractive power, the second lens has positive refractive power, the third lens has negative refractive power, the fourth lens has positive refractive power, and the fifth lens has negative refractive power.

In an implementation mode, an effective focal length f1 of the first lens and an effective focal length f2 of the second lens meet 0.1<f1/f2<0.3.

In an implementation mode, the total effective focal length f of the optical imaging system and an effective focal length f4 of the fourth lens meet 1.0<f/f4<3.0.

In an implementation mode, an effective focal length f3 of the third lens and an effective focal length f5 of the fifth lens meet 2.0<f3/f5<3.0.

In an implementation mode, a sum ΣCT of center thicknesses of each lens in the first lens to the fifth lens meets 1.0 mm<ΣCT/5<1.5 mm.

According to the disclosure, the first prism and the second prism are adopted to fold back an optical path to form a 90° angle between an object surface and the imaging surface to further reduce an optical length of the optical imaging system in the first direction and miniaturize the optical imaging system. In addition, the optical imaging system may have a relatively great focal length and may further have a relatively good optical zoom ratio. Moreover, the optical imaging system has relatively high optical imaging quality.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
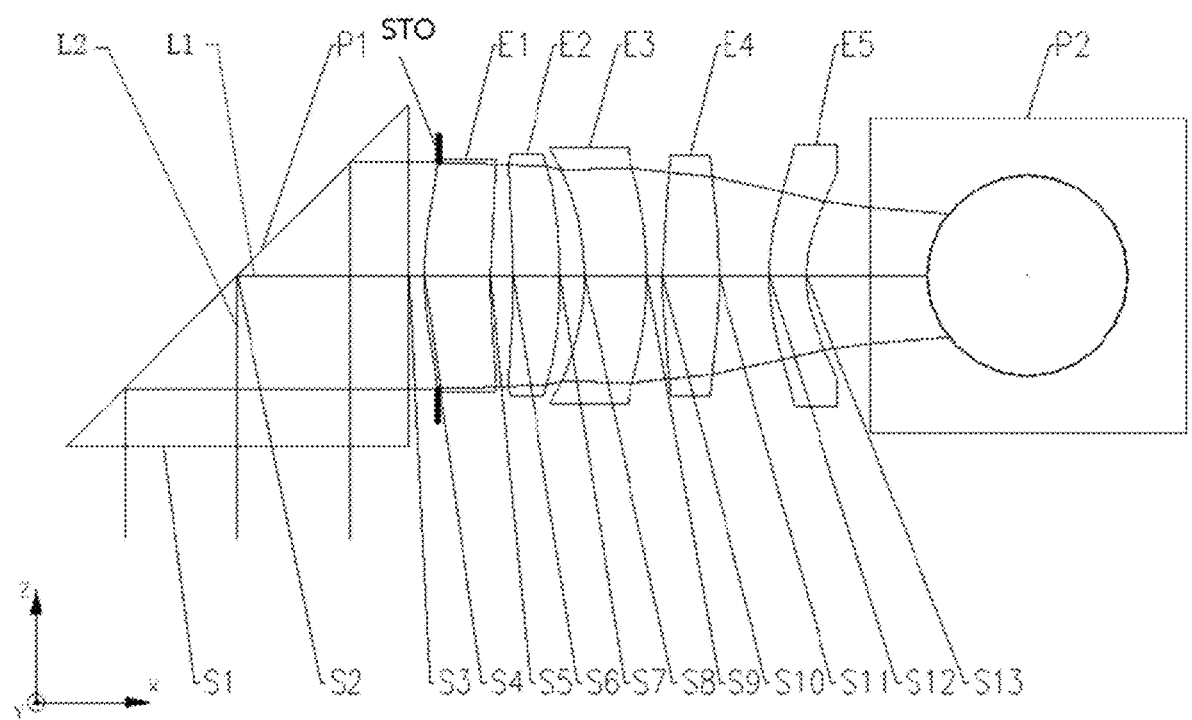
FIG. 1 is a schematic front view of an optical imaging system according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or al combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspherical shape shown in the drawings is shown by some embodiments. That is, the spherical shape or the aspherical shape is not limited to the spherical shape or aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, al terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging system according to an exemplary implementation mode of the disclosure may include a first prism, a lens group and a second prism. They are sequentially arranged from an object side to an image side along a first direction. The lens group may include, for example, five lenses with refractive power, i.e., a first lens, a second lens, a third lens, a fourth lens and a fifth lens. The five lenses are sequentially arranged from the object side to the image side along an optical axis in the first direction. In the first lens to the fifth lens, there may be an air space between any two adjacent lenses. There may be an air space between the first lens and the first prism. There may be an air space between the fifth lens and the second prism.

The first prism is arranged on the object side of the lens group. Exemplarily, the first prism may be a triangular prism and includes a first incident surface, a first reflecting surface and a first emergent surface. An included angle between the first reflecting surface and the first direction is 45°. The first emergent surface may be perpendicular to the first direction. A second direction is perpendicular to the first direction and forms an included angle of 45° with the first reflecting surface. The first reflecting surface may be configured to reflect light incident along the second direction into light emergent along the first direction. The first incident surface may be perpendicular to the second direction. Exemplarily, the first prism may also be a reflecting surface and usually has the first reflecting surface.

The second prism is arranged on the image side of the lens group. Exemplarily, the second prism may be a triangular prism and includes a second incident surface, a second reflecting surface and a second emergent surface. An included angle between the second reflecting surface and the first direction is 45°. The second incident surface may be perpendicular to the first direction. A third direction is perpendicular to the first direction and forms an included angle of 45° with the second reflecting surface, and meanwhile, the third direction is perpendicular to the second direction. The second reflecting surface is configured to reflect light incident along the first direction into light emergent along the third direction. The second emergent surface may be perpendicular to the third direction.

An optical path is folded back twice through the first prism and the second prism, and the reflecting surface of the first prism forms an included angle of approximately 30° with the reflecting surface of the second prism, so that a 90° angle is formed between an object surface and an imaging surface to further reduce an optical length of the optical imaging system in the first direction and miniaturize the optical imaging system. In addition, the optical imaging system may have a relatively great focal length and may further have a relatively good optical zoom ratio.

In the exemplary implementation mode, the optical imaging system may further include at least one diaphragm. The diaphragm may be arranged at a proper position as required, for example, arranged between the first prism and the first lens. Optionally, the optical imaging system may further include an optical filter configured to correct a chromatic aberration and/or protective glass configured to protect a photosensitive element on the imaging surface. The optical filter and/or the protective glass may be on an image side of the second prism.

In the exemplary implementation mode, at least one lens in the lens group is a plastic lens, and at least one surface of the plastic lens is an aspherical surface. The plastic lens is adopted and the plastic lens has the aspherical surface, so that improvement of the degree of design freedom of the lens is facilitated, and meanwhile, an on-axis spherical aberration and off-axis comatic aberration of the optical imaging system may further be reduced. Exemplarily, the first lens is a plastic lens, and an object-side surface of the first lens is an aspherical surface.

In the implementation mode of the disclosure, at least one of surfaces of each lens is an aspherical surface, namely at least one of the object-side surface of the first lens to an image-side surface of the fifth lens is an aspherical surface. An aspherical lens has a characteristic that a curvature keeps changing from a center of the lens to a periphery of the lens. Unlike a spherical lens with a constant curvature from a center of the lens to a periphery of the lens, the aspherical lens has a better curvature radius characteristic and the advantages of improving distortions and improving astigmatic aberrations. With adoption of the aspherical lens, astigmatic aberrations during imaging may be eliminated as much as possible, thereby improving the imaging quality. Optionally, at least one of the object-side surface and image-side surface of each lens in the first lens, the second lens, the third lens, the fourth lens and the fifth lens is an aspherical surface. Optionally, both the object-side surface and image-side surface of each lens in the first lens, the second lens, the third lens, the fourth lens and the fifth lens are aspherical surfaces.

In the exemplary implementation mode, the optical imaging system of the disclosure may meet a conditional expression f>20 mm, wherein f is a total effective focal length of the optical imaging system. The conditional expression may be controlled to achieve a telephoto feature of the optical imaging system. Exemplarily, f may meet f>22 mm. More specifically, f may meet 23 mm<f<25 mm.

In the exemplary implementation mode, the lens group includes the five lenses, wherein the first lens may have positive refractive power, the second lens may have positive refractive power, the third lens may have negative refractive power, the fourth lens may have positive refractive power, and the fifth lens may have negative refractive power. Configuration of the positive and negative refractive power of each component of the system and curvatures of surface types of the lenses may be reasonably controlled to effectively reduce a temperature drift offset of the telephoto optical imaging system and further improve the imaging quality of the optical imaging system at different temperatures.

In the exemplary implementation mode, the optical imaging system of the disclosure may meet a conditional expression 1.0<f/Ty<3.0, wherein f is the total effective focal length of the optical imaging system, and Ty is a length of the optical imaging system in the third direction. The conditional expression may be restricted to ensure that an optical path in the third direction is relatively short under the condition that the total effective focal length of the optical imaging system reaches a required magnification factor to further reduce the size of the optical imaging system. More specifically, f and Ty may meet 1.3<f/Ty<2.0.

In the exemplary implementation mode, the optical imaging system of the disclosure may meet a conditional expression 2.0<f/Tz<4.0, wherein f is the total effective focal length of the optical imaging system, and Tz is a length of the optical imaging system in the second direction. The conditional expression may be restricted to ensure that an optical path in the second direction is relatively short under the condition that the total effective focal length of the optical imaging system reaches the required magnification factor to further reduce the size of the optical imaging system. More specifically, f and Tz may meet 2.5<f/Tz<3.5.

In the exemplary implementation mode, the optical imaging system of the disclosure may meet a conditional expression f/ImgH>8, wherein f is the total effective focal length of the optical imaging system, and ImgH is a half of a diagonal length of an effective pixel region on the imaging surface of the optical imaging system. Controlling a ratio of the total effective focal length to an image height is favorable for achieving an adequate telephoto capability of the optical imaging system and improving the magnification factor for a shot object. More specifically, f and ImgH may meet f/ImgH>9.0.

In the exemplary implementation mode, the optical imaging system of the disclosure may meet a conditional expression f/EPD≤4.0, wherein f is the total effective focal length of the optical imaging system, and EPD is an Entrance Pupil Diameter of the optical imaging system. A ratio of the total effective focal length to the EPD may be controlled to improve a luminous flux of a super telephoto optical imaging lens and improve a signal to noise ratio of image data. More specifically, f and EPD may meet 3.0<f/EPD≤4.0.

In the exemplary implementation mode, the optical imaging system of the disclosure may meet a conditional expression 0<N2−N1<0.2, wherein N1 is a refractive index of the first lens, and N2 is a refractive index of the second lens. Exemplarily, the optical imaging system of the disclosure may meet a conditional expression 0<V1−V2<10, wherein V1 is an Abbe number of the first lens, and V2 is an Abbe number of the second lens. Controlling the refractive index and Abbe number of the first lens and the refractive index and Abbe number of the second lens to meet the aforementioned relationship is favorable for reducing a longitudinal aberration of the optical imaging system and improving the imaging quality of the optical imaging system. More specifically, N1 and N2 may meet 0<N2−N1<0.1. More specifically, V1 and V2 may meet 5.0<V1−V2<9.0.

In the exemplary implementation mode, the optical imaging system of the disclosure may meet a conditional expression 50<(V4+V5)/2<60, wherein V4 is an Abbe number of the fourth lens, and V5 is an Abbe number of the fifth lens. Controlling the Abbe number of the fourth lens and the Abbe number of the fifth lens is favorable for reducing a lateral color of the optical imaging system, improving the imaging quality of the optical imaging system and increasing a Modulation Transfer Function (MTF) value. More specifically, V4 and V5 may meet 55<(V4+V5)/2<59.

In the exemplary implementation mode, the optical imaging system of the disclosure may meet a conditional expression 0.1<f1/f2<0.3, wherein f1 is an effective focal length of the first lens, and f2 is an effective focal length of the second lens. Controlling a ratio of the effective focal lengths of the first lens and the second lens is favorable for reducing a distortion of the optical imaging system and further reducing a distortion of a shot object in an image. More specifically, f, f1 and f2 may meet 0.15<f1/f2<0.20.

In the exemplary implementation mode, the optical imaging system of the disclosure may meet a conditional expression 1.0f/f4<3.0, wherein f is the total effective focal length of the optical imaging system, and f4 is an effective focal length of the fourth lens. Controlling a ratio of the total effective focal length to the effective focal length of the fourth lens is favorable for reducing the inclination sensitivity of the fourth lens and further reducing the inclination tolerance sensitivity of the optical imaging system. More specifically, f and f4 may meet 1.5<f/f4<2.0.

In the exemplary implementation mode, the optical imaging system of the disclosure may meet a conditional expression 2.0<f3/f5<3.0, wherein f3 is an effective focal length of the third lens, and f5 is an effective focal length of the fifth lens. Controlling a ratio of the effective focal length of the third lens to the effective focal length of the fifth lens is favorable for reducing the eccentricity sensitivity of the third lens and the fifth lens and improving the overall yield distribution of the optical imaging system and favorable for manufacturing and producing the optical imaging system. More specifically, f3 and f5 may meet 2.1<f3/f5<2.5.

In the exemplary implementation mode, the optical imaging system of the disclosure may meet a conditional expression 1.0 mm<ΣCT/5<1.5 mm, wherein ΣCT is a sum of center thicknesses of each lens in the first lens to the fifth lens. Controlling the conditional expression may improve a back focal length of the optical imaging system and is favorable for arranging an auxiliary complex optical path imaging system such as a prism and a reflecting surface in the optical imaging system. Exemplarily, ΣCT=CT1+CT2+CT3+CT4+CT5, wherein CT1 is the center thickness of the first lens. More specifically, ΣCT may meet 1.15 mm<ΣCT/5<1.45 mm.

Multiple lenses, for example, the abovementioned five, may be adopted in the lens group of the optical imaging system according to the implementation mode of the disclosure. The refractive power and surface types of each lens, the center thickness of each lens, on-axis distances between the lenses and the like may be reasonably configured to effectively increase the focal length of the system, reduce the sensitivity of the imaging system, improve the machinability of the imaging system and ensure that the optical imaging system is more favorable for production and machining and applicable to a portable electronic product. In addition, matching with the first prism and the second prism is favorable for compressing the optical length in the first direction. The optical imaging system of the disclosure may also be configured for functions of optical zooming, etc.

However, those skilled in the art should know that the number of the lenses forming the optical imaging system may be changed without departing from the technical solutions claimed in the disclosure to achieve each result and advantage described in the specification. For example, although descriptions are made in the implementation mode with five lenses as an example, the optical imaging system is not limited to five lenses. If necessary, the optical imaging system may also include another number of lenses.

Specific embodiments of the optical imaging system applied to the abovementioned implementation mode will further be described below with reference to the drawings.

Embodiment 1

Figure 2:
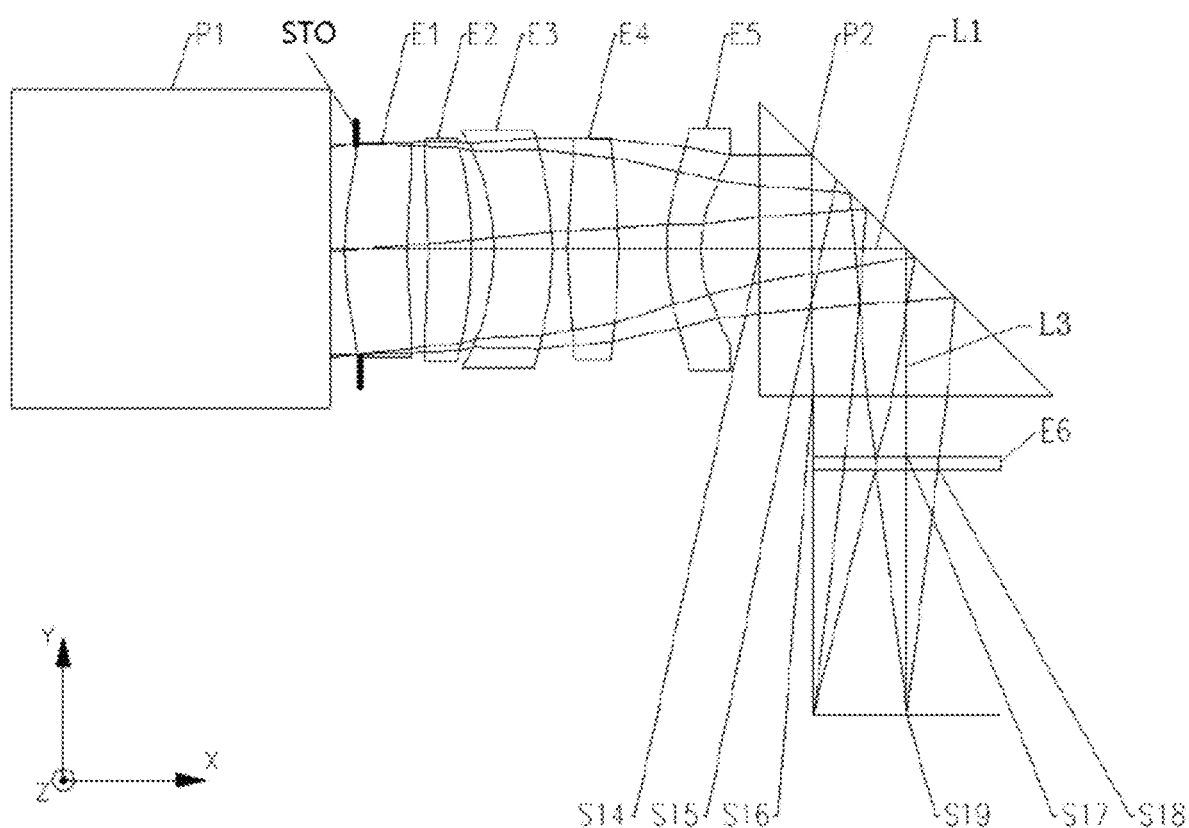
FIG. 2 is a schematic top view of an optical imaging system according to embodiment 1 of the disclosure.

An optical imaging system according to embodiment 1 of the disclosure will be described below with reference to FIG. 1 to FIG. 4. FIG. 1 is a schematic front view of an optical imaging system according to embodiment 1 of the disclosure. FIG. 2 is a schematic top view.

As shown in FIG. 1, the optical imaging system sequentially includes, from an object side to an image side along a first direction X, a first prism P1, a first lens E1, a second lens E2, a third lens E3, a fourth lens E4, a fifth lens E5, a second prism P2 and an optical filter E6.

The first prism P1 includes a first incident surface S1, a first reflecting surface S2 and a first emergent surface S3, and an included angle between the first reflecting surface S1 and the first direction X is 45°. Light L2 incident along a second direction Z is folded back to light L1 propagated along the first direction X at the first reflecting surface S2. The diaphragm is also arranged between the first prism P1 and the first lens E1.

The first lens E1 has positive refractive power, an object-side surface S4 thereof is a convex surface, while an image-side surface S5 is a concave surface. The second lens E2 has positive refractive power, an object-side surface S6 thereof is a concave surface, while an image-side surface S7 is a convex surface. The third lens E3 has negative refractive power, an object-side surface S8 thereof is a concave surface, while an image-side surface S9 is a convex surface. The fourth lens E4 has positive refractive power, an object-side surface S10 thereof is a convex surface, while an image-side surface S11 is a convex surface. The fifth lens E5 has negative refractive power, an object-side surface S12 thereof is a convex surface, while an image-side surface S13 is a concave surface.

The second prism P2 includes a second incident surface S14, a second reflecting surface S15 and a second emergent surface S16, and an included angle between the second reflecting surface S15 and the first direction X is 45°. Light L1 incident along the first direction X is folded back to light L3 propagated along a third direction Y at the second reflecting surface S15. In addition, the third direction Y is perpendicular to the second direction Z.

The optical filter E6 has an object-side surface S17 and an image-side surface S18. The optical imaging system has an imaging surface S19. Light from an object (including the light L1 at the optical axis in the second direction Z and marginal light) sequentially penetrates through (or passes through) each of the surfaces S1 to S18 and is finally imaged on the imaging surface S19.

Table 1 is a basic parameter table of the optical imaging system of embodiment 1, and units of the curvature radius, the thickness and the focal length are all millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Plane | Infinite | Infinite | | | | |
| S1 | Plane | Infinite | 4.5511 | 1.517 | 64.17 | | |
| S2 | Plane | Infinite | 4.5511 | 1.517 | 64.17 | | |
| S3 | Plane | Infinite | 0.7279 | | | | |
| STO | Plane | Infinite | −0.3259 | | | | |
| S4 | Aspherical | 9.6130 | 1.7722 | 1.517 | 64.17 | 33.37 | −7.1426 |
| S5 | Aspherical | 20.3575 | 0.5975 | | | | −82.2507 |
| S6 | Aspherical | −23.3795 | 1.2461 | 1.544 | 56.11 | 181.94 | −92.2650 |
| S7 | Aspherical | −11.2985 | 0.6516 | | | | 0.0000 |
| S8 | Aspherical | −6.4404 | 1.6703 | 1.517 | 64.17 | −36.07 | −0.4900 |
| S9 | Aspherical | −11.2641 | 0.4124 | | | | 0.0000 |
| S10 | Aspherical | 12.7715 | 1.4899 | 1.544 | 56.11 | 12.35 | −87.3562 |
| S11 | Aspherical | −13.5980 | 1.3496 | | | | −60.9607 |
| S12 | Aspherical | 9.5354 | 0.9690 | 1.534 | 55.74 | −15.69 | 0.0000 |
| S13 | Aspherical | 5.5324 | 1.6957 | | | | |
| S14 | Plane | Infinite | 4.2010 | 1.517 | 64.17 | | |
| S15 | Plane | Infinite | 4.2010 | 1.517 | 64.17 | | |
| S16 | Plane | Infinite | 1.6944 | | | | |
| S17 | Plane | Infinite | 0.3851 | 1.517 | 64.17 | | |
| S18 | Plane | Infinite | 7.0678 | | | | |
| S19 | Plane | Infinite | | | | | |

In embodiment 1, a value of a total effective focal length f of the optical imaging system is 24.00 mm, and a value of a maximum Field Of View (FOV) is 12.6°.

In embodiment 1, both the object-side surface and image-side surface of any lens in the first lens E1 to the fifth lens E5 are aspherical surfaces, and a surface type x of each aspherical lens may be defined through, but not limited to, the following aspherical surface formula:

$$x = \frac{ch^2}{1+\sqrt{1-(k+1)c^2h^2}} + \sum Aih^i, \quad (1)$$

wherein x is a distance vector height from a vertex of the aspherical surface when the aspherical surface is at a height of h along the optical axis direction; c is a paraxial curvature of the aspherical surface, c==1/R (namely, the paraxial curvature c is a reciprocal of the curvature radius R in Table 1); k is a cone coefficient; and Ai is a correction coefficient of the i-th order of the aspherical surface. Table 2 shows high-order coefficients $A_4$, $A_6$, $A_8$, $A_{10}$, $A_{12}$, $A_{14}$, $A_{16}$, $A_{18}$ and $A_{20}$ applied to each of the aspherical surfaces S4-S13 in embodiment 1.

TABLE 2

| Surface number | A4 | A6 | A8 | A10 | A12 |
|---|---|---|---|---|---|
| S4 | 6.5018E−02 | 1.9356E−02 | 4.9292E−04 | −6.4124E−05 | −1.0449E−04 |
| S5 | 4.6680E−02 | 2.7299E−02 | −9.0126E−03 | −2.8068E−03 | −3.4874E−04 |
| S6 | −6.7682E−02 | −2.8107E−02 | −1.0635E−03 | −5.6094E−04 | 2.3210E−03 |
| S7 | −2.5958E−01 | 5.4885E−02 | −2.2406E−02 | 6.0319E−03 | −8.7768E−03 |
| S8 | −2.9115E−02 | 3.0192E−02 | 1.7983E−03 | −6.0309E−03 | −6.9128E−04 |
| S9 | 1.7447E−01 | −9.0705E−02 | 5.2802E−02 | −2.1087E−02 | 4.8637E−03 |
| S10 | 1.1088E−02 | 4.1038E−03 | −6.7942E−03 | 3.5531E−04 | −1.5298E−04 |
| S11 | 1.6933E−03 | −1.0495E−02 | 6.8909E−03 | −5.0012E−04 | 2.3296E−04 |
| S12 | −3.3023E−01 | 3.2598E−03 | 1.9951E−02 | −2.5149E−02 | 1.2605E−02 |
| S13 | −4.4666E−01 | −5.2210E−02 | 8.3730E−03 | −1.4385E−02 | 5.6913E−03 |

| Surface number | A14 | A16 | A18 | A20 |
|---|---|---|---|---|
| S4 | −3.7724E−05 | −4.3844E−05 | −2.4528E−05 | −8.8362E−06 |
| S5 | 6.0546E−05 | 2.4585E−04 | 3.1587E−04 | 7.7389E−05 |
| S6 | 1.0103E−03 | 1.0544E−03 | 5.8282E−04 | 5.2065E−05 |
| S7 | 3.6553E−03 | −1.4870E−03 | −2.0575E−03 | 1.1907E−03 |
| S8 | −5.4877E−04 | 2.0005E−04 | −1.3706E−04 | −1.1574E−34 |
| S9 | −2.4433E−03 | 1.2569E−03 | −2.0754E−04 | −1.3693E−04 |
| S10 | 1.0088E−04 | −4.0030E−04 | 2.9430E−05 | 6.4232E−05 |
| S11 | −6.9774E−04 | −2.4324E−04 | 1.1347E−04 | 7.3324E−05 |
| S12 | −2.3112E−03 | −1.5124E−03 | 3.7053E−04 | 1.6117E−04 |
| S13 | −1.3423E−03 | 1.3683E−04 | −6.2066E−04 | 3.2276E−04 |

Figure 3:
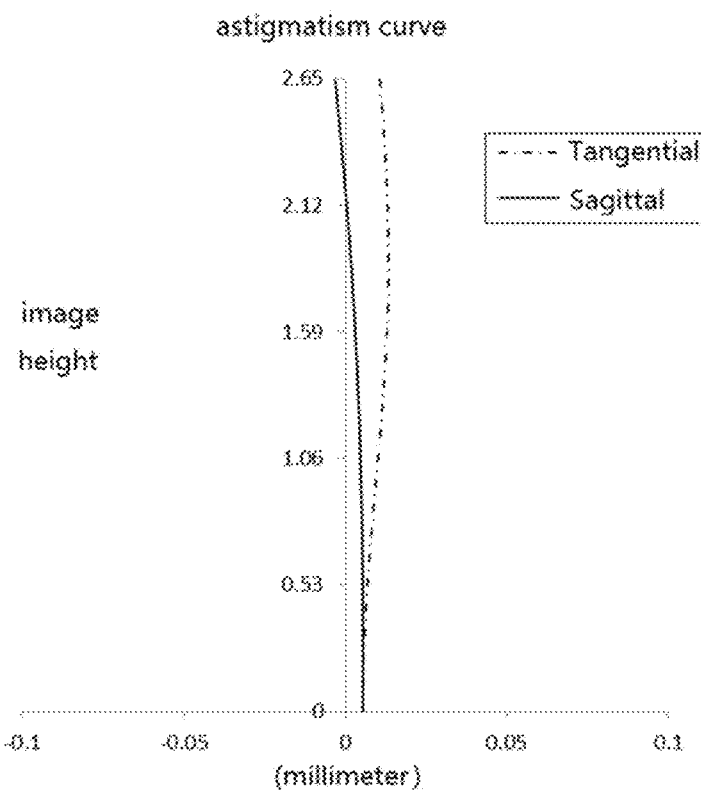
FIG. 3 and FIG. 4 show an astigmatism curve and a distortion curve of an optical imaging system according to embodiment 1 respectively.
Figure 4:
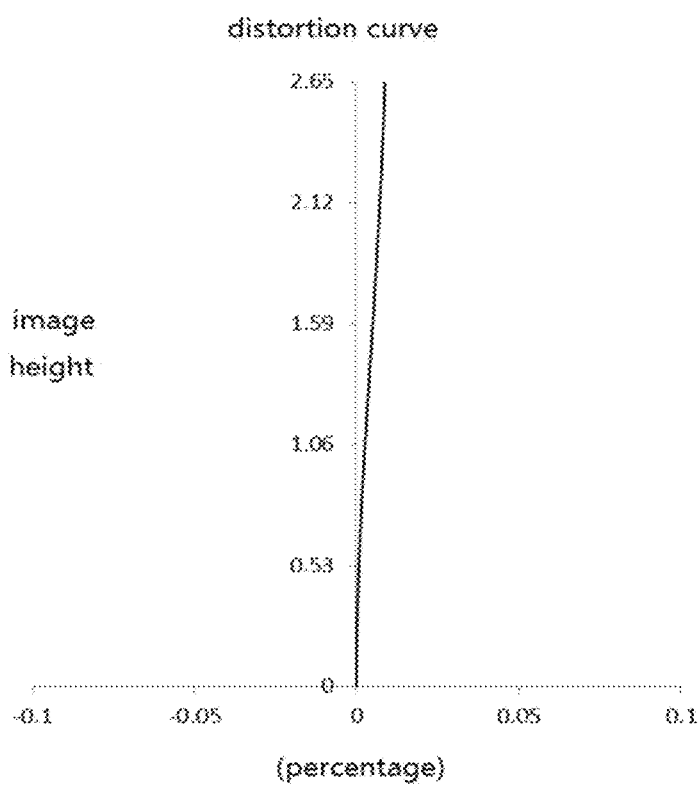

FIG. 3 shows an astigmatism curve of the optical imaging system according to embodiment 1 to represent a meridian image surface curvature and a sagittal image surface curvature. FIG. 4 shows a distortion curve of the optical imaging system according to embodiment 1 to represent distortion values corresponding to different image heights. According to FIG. 3 to FIG. 4, it can be seen that the optical imaging system provided in embodiment 1 may achieve high imaging quality.

From the above, embodiment 1 meets a relationship shown in Table 3.

TABLE 3

| Conditional expression/embodiment | 1 |
|---|---|
| f/Ty | 1.34 |
| f/Tz | 2.64 |
| f/ImgH | 9.06 |
| f/EPD | 4.00 |
| N2 − N1 | 0.03 |
| V1 − V2 | 8.06 |
| (V4 + V5)/2 | 55.93 |
| f1/f2 | 0.18 |
| f/f4 | 1.94 |
| f3/f5 | 2.30 |
| ΣCT/5 (mm) | 1.43 |

The disclosure also provides an imaging device, which is provided with an electronic photosensitive element for imaging. The electronic photosensitive element may be a CCD or a CMOS. The imaging device may be an independent imaging device such as a digital camera, and may also be an imaging module integrated into a mobile electronic device such as a mobile phone. The imaging device is provided with the abovementioned optical imaging system.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What claimed is:

1. An optical imaging system, comprising: a lens group, sequentially comprising, from an object side to an image side along a first direction, a first lens, a second lens, a third lens, a fourth lens and a fifth lens with refractive power; wherein
   a first prism, arranged on the object side of the lens group and configured to reflect light incident into the first prism along a second direction to be emergent from the first prism along the first direction; and
   a second prism, arranged on the image side of the lens group and configured to reflect light incident into the second prism along the first direction to be emergent from the second prism along a third direction,
   wherein the first direction, the second direction and the third direction are perpendicular to one another,
   at least one lens in the lens group is a plastic lens, and at least one surface of the plastic lens is an aspherical surface, the first lens has positive refractive power, the second lens has positive refractive power, the third lens has negative refractive power, the fourth lens has positive refractive power, and the fifth lens has negative refractive power; and
   a total effective focal length f of the optical imaging system meets 20 mm<f<25 mm.

2. The optical imaging system according to claim 1, wherein ImgH is a half of a diagonal length of an effective pixel region on an imaging surface of the optical imaging system, the total effective focal length f of the optical imaging system and ImgH meet 8<f/ImgH<10.

3. The optical imaging system according to claim 1, wherein a refractive index N1 of the first lens and a refractive index N2 of the second lens meet 0<N2−N1<0.2; and
   an Abbe number V1 of the first lens and an Abbe number V2 of the second lens meet 0<V1−V2<10.

4. The optical imaging system according to claim 1, wherein an Abbe number V4 of the fourth lens and an Abbe number V5 of the fifth lens meet $50<(V4+V5)/2<60$.

5. The optical imaging system according to claim 1, wherein an effective focal length f1 of the first lens and an effective focal length f2 of the second lens meet $0.1<f1/f2<0.3$.

6. The optical imaging system according to claim 1, wherein the total effective focal length f of the optical imaging system and an effective focal length f4 of the fourth lens meet $1.0<f/f4<3.0$.

7. The optical imaging system according to claim 1, wherein an effective focal length f3 of the third lens and an effective focal length f5 of the fifth lens meet $2.0<f3/f5<3.0$.

8. The optical imaging system according to claim 1, wherein a sum ΣCT of center thicknesses of each lens in the first lens to the fifth lens meets $1.0\ \text{mm}<\Sigma CT/5<1.5\ \text{mm}$.

9. An optical imaging system, comprising: a lens group, sequentially comprising, from an object side to an image side along a first direction, a first lens, a second lens, a third lens, a fourth lens and a fifth lens with refractive power; wherein
  a first prism, arranged on the object side of the lens group and configured to reflect light incident into the first prism along a second direction to be emergent from the first prism along the first direction; and
  a second prism, arranged on the image side of the lens group and configured to reflect light incident into the second prism along the first direction to be emergent from the second prism along a third direction,
  wherein the first direction, the second direction and the third direction are perpendicular to one another,
  at least one lens in the lens group is a plastic lens, and at least one surface of the plastic lens is an aspherical surface, the first lens has positive refractive power, the second lens has positive refractive power, the third lens has negative refractive power, the fourth lens has positive refractive power, and the fifth lens has negative refractive power; and
  ImgH is a half of a diagonal length of an effective pixel region on an imaging surface of the optical imaging system, a total effective focal length f of the optical imaging system and ImgH meet $8<f/\text{ImgH}<10$.

10. The optical imaging system according to claim 9, wherein the total effective focal length f of the optical imaging system meets $20\ \text{mm}<f<25\ \text{mm}$.

11. The optical imaging system according to claim 9, wherein a refractive index N1 of the first lens and a refractive index N2 of the second lens meet $0<N2-N1<0.2$; and
  an Abbe number V1 of the first lens and an Abbe number V2 of the second lens meet $0<V1-V2<10$.

12. The optical imaging system according to claim 9, wherein an Abbe number V4 of the fourth lens and an Abbe number V5 of the fifth lens meet $50<(V4+V5)/2<60$.

* * * * *